United States Patent
Tschunt

[15] 3,697,751
[45] Oct. 10, 1972

[54] APPARATUS FOR RADIATION DIAGNOSIS

[72] Inventor: Edgar Tschunt, Erlangen, Germany

[73] Assignee: Siemens Aktiengesellschaft, Munich, Germany

[22] Filed: May 21, 1969

[21] Appl. No.: 826,589

[30] Foreign Application Priority Data

May 29, 1968 Germany..........P 17 64 389.9

[52] U.S. Cl. ................250/50, 250/61.5, 250/71.5 S
[51] Int. Cl..............................G01j 39/18, G01t 1/20
[58] Field of Search..250/50, 52, 53, 54, 61.5, 71.5 S

[56] References Cited

UNITED STATES PATENTS

| | | |
|---|---|---|
| R26,014 | 5/1966 | Stickney et al. ..........250/71.5 |
| 2,789,231 | 4/1957 | Dumer......................250/61.5 |
| 2,798,958 | 7/1957 | Hudson et al.............250/61.5 |
| 3,116,416 | 12/1963 | Reed ..........................250/53 |
| 3,432,660 | 3/1969 | Anger.......................250/71.5 |

Primary Examiner—William F. Lindquist
Attorney—Richards & Geier

[57] ABSTRACT

An apparatus for radiation diagnosis having a radiation detector movably mounted on a support arm which is connected to a stand mounted in the housing of the apparatus. The apparatus has an elongate support member secured to a lower end region of the housing below the support arm, which member is adapted to carry a chair for accommodating a patient.

9 Claims, 1 Drawing Figure

PATENTED OCT 10 1972 3,697,751
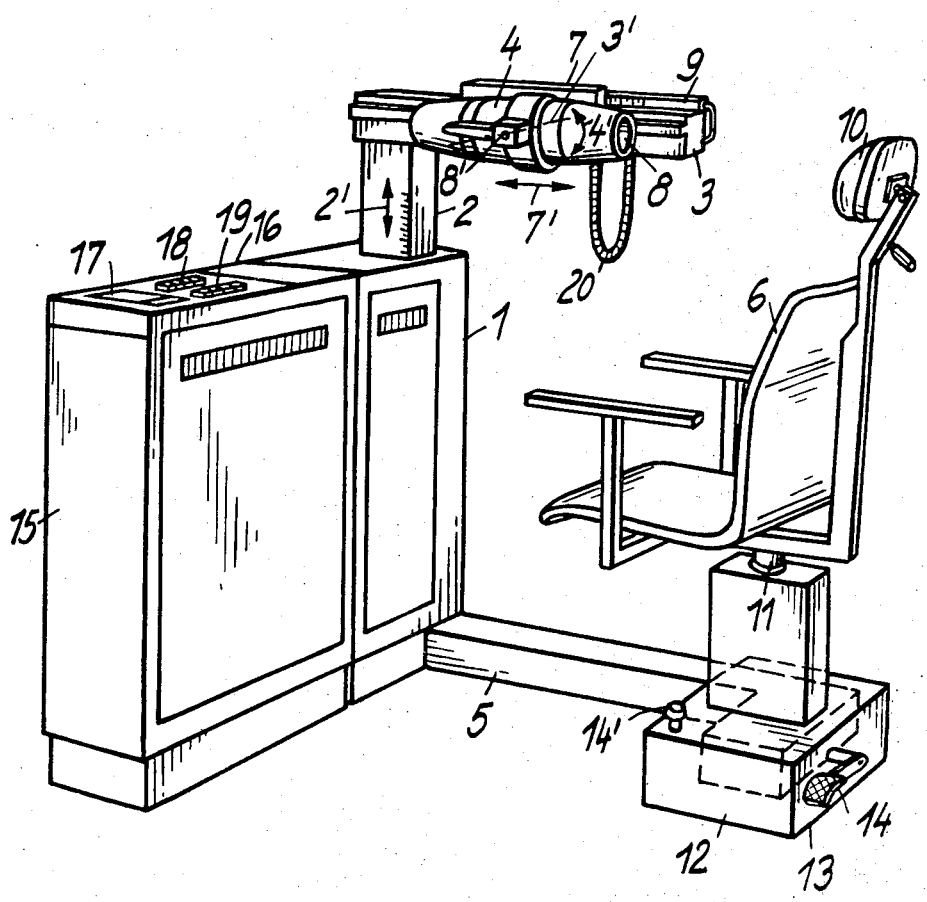
INVENTOR:
E. Tschunt
BY
Richards & Geier
ATTORNEYS

APPARATUS FOR RADIATION DIAGNOSIS

BACKGROUND OF INVENTION

1. Field of Invention

The present invention relates to an apparatus for radiation diagnosis having a stand on which a radiation detector can be displaced linearly along a support arm which can be raised and lowered.

2. Description of Prior Art

Apparatus of this kind is used in order to measure the amount of radiation emitted from an examination zone. One of the best known fields of application, for example, is in medical diagnosis, for example when diagnosing conditions of the thyroid gland of a human patient who has been administered radioactive iodine (J 131). In this context, the amount of radioactive iodine which has been absorbed by the thyroid gland, is measured over longish periods of several hours or days for example.

In medical diagnosis e.g. diagnosis of conditions of thyroid glands, the patient is normally placed upon a chair and the radiation detector, which defines a radiation entry aperture, is directed onto the examination zone with the radiation aperture in alignment therewith for example the throat. Then, the radiation detector will only receive radiation which comes from the relevant location. The amount of radiation entering the detector is dependent upon the alignment, spacing and angle of the detector, relatively to the examination zone. In examinations which extend over lengthy periods, for example hours or days, and in subsequent repeat measurements, it is difficult to precisely reproduce the exact alignment of the radiation entry aperture with the site being examined. Accordingly, the radiation detector has in the past been provided with an adjustable indicator by means of which, in particular, the spacing from the examination zone, could be relocated by means of a scale. Nevertheless, it is still difficult to precisely re-establish the angle of adjustment of the detector. The results of different measurements are therefore not easily comparable with one another. Moreover, comparison of measurements made at different medical institutes is generally out of the question because of possible differences in adjustment.

The main object of the present invention, is to provide an apparatus for a radiation diagnosis in which the aforesaid disadvantages are minimized or eliminated.

SUMMARY OF INVENTION

According to the present invention there is provided an apparatus for radiation diagnosis to determine the amount of radiation emitted from a body, said apparatus comprising;

a. an upright elongate housing;
b. an elongate support member secured to a lower end region of said housing and adapted to carry a chair for accommodating a patient;
c. a support stand mounted in said housing;
d. a support arm disposed above said elongate support member and connected to said stand for linear upward and downward movement with respect to the housing;
e. a radiation detector defining a radiation entry aperture mounted on said support arm,
f. means for permitting upward and downward pivotal movement of said detector, and
g. means for effecting linear movement of said detector along said support arm, whereby the position of the radiation entry aperture of the detector with respect to the chair is variable.

BRIEF DESCRIPTION OF DRAWING

In order that the invention may be more fully understood an embodiment in accordance therewith will now be described by way of example with reference to the accompanying drawing which shows a perspective view of an apparatus for radiation diagnosis for thyroid gland examination.

DESCRIPTION OF PREFERRED EMBODIMENT

In the drawing there is shown an upright and elongate housing 1 in which a support stand 2 in the form of a column can be vertically adjusted linearly in the direction of the double-headed arrow 2', the stand carrying at its upper end a support arm 3 which carries a radiation detector 4. The radiation detector 4 includes a radiation measuring device in a radiation opaque, i.e., shielding, enclosure and defines a radiation entry aperture 8 which is directed towards the examination zone, in this case the throat of a patient. An elongate support member 5 is secured to the bottom end of the housing and is adapted to carry means for accommodating a patient constituted by a diagnostic chair 6. The detector 4 is secured to the arm 3 in such fashion as to be longitudinally displaceable on a carriage 7 as indicated by the double-headed arrow 7', so that the spacing between the detector 4 and the chair 6 can be varied. The carriage 7 carries a horizontal shaft (not shown), the axis of which is indicated by the dotted line 3' about which the detector 4 can be pivoted in the direction of the double-headed arrow 4' so that its radiation entry opening 8 can swing through 90° in the upward direction and through a similar angular extent in the downward direction, when a releasable locking means such as a latch is released by depression of a button 8'. Also, the carriage 7 carries a slidable bar scale 9 which is displaceable parallel to the arrow 7' so that it is possible to determine how far the entry aperture 8 is from the throat of a patient seated in the chair 6 with his head supported by the headrest 10. Scales are also provided on the column 2, the arm 3, and the detector 4, all the scales enabling the position of the detector in terms of height, spacing from the column 2, from the patient and angle of rotation to be read off.

The chair 6 may be rotated through 90° about the axis of the shaft 11 so that the seat surface can be swung in the direction of an end face 12 of the base 13 of the chair 6. The base 13 can also be swung through 90° relative to the member 5, thus allowing a patient to seat himself upon and rise from the chair, without any difficulty. The chair 6, by releasing a brake (not shown) operated by the pedal 14, can be displaced in the direction of the end face 12 so that the detector 4 can be aligned with the shoulder of a patient sitting on the chair 6, in order to determine the background radiation. By pressing a button 14', a releaseably locking means is released and the chair can be slid right out from beneath the support member 5 in order to allow a bed-ridden patient to be moved beneath the detector 4. It will thus be appreciated that the detector 4 may be suitably aligned with the examination zone even if the chair 6 is removed and replaced by any other means for accommodating the patient such as a bed.

On one of the narrow sides of the housing 1, at right-angles to the support member 5 a housing 15 containing electronic means connected to the radiation detector by a lead 20, is releasably attached. The housing 15 is provided on its upper surface 16 with control and indicator elements, symbolically indicated by the references 17, 18 and 19. By means of these elements, in the conventional way the electronic means contained in the housing 15 are controlled, namely a pulse counter, a store and possible other electronic computing arrangements for processing the measurements coming via the lead 20 from the detector 4. The housing 15 may be made integral with the housing 1. The measurements can, on the other hand, be supplied to a suitable available processing system so that the housing 15 and its contents can then be dispensed with.

The apparatus described has the advantage that on the one hand, the fixed arrangement of the patient chair and its consequent alignment vis-a-vis the support stand, enable a standard alignment to be achieved between the examination zone, for example the thyroid gland of the patient, and the detector which is mounted on the stand. In other words, the detector also, because of its attachment to the support stand, is secured in a specific position vis-a-vis the patient in the chair. Also, the position of the detector can be fixed vis-a-vis the patient in the chair, in terms of measurements of the height of the detector on the column, its spacing from the patient and its angle relative to the horizontal, and these settings can subsequently be reproduced.

I claim:
1. An apparatus for radiation diagnosis to determine the amount of radiation emitted from a radioactive material administered to the body of a patient, said apparatus comprising;
   a. an upright elongate housing,
   b. an elongate support member secured to a lower end region of said housing and adapted to carry a chair for accommodating a patient;
   c. a single support stand mounted in said housing;
   d. a single support arm disposed above said elongate support member and connected to said stand for linear upward and downward movement with respect to the housing;
   e. a radiation detector defining a radiation entry aperture mounted on said support arm;
   f. means for permitting upward and downward pivotal movement of said detector; and
   g. means for effecting linear movement of said detector along said support arm, whereby the position of the radiation entry aperture of the detector with respect to the chair is variable.

2. An apparatus as set forth in claim 1, wherein said support arm and said elongate support member are disposed in a common vertical plane.

3. An apparatus as set forth in claim 1, wherein said support stand is counterpoised and is vertically displaceable in the housing, the free end of the support stand being angled through 90° to form said support arm.

4. An apparatus as set forth in claim 3, wherein the means for effecting linear movement of the detector along the support arm include a carriage secured to said detector and slidably mounted on said support arm.

5. An apparatus as set forth in claim 4, wherein the means for permitting pivotal movement of said detector includes a substantially horizontal shaft extending transversely of the support arm from a side face of the carriage and releasable locking means for locking said detector in a desired pivoted position.

6. An apparatus as set forth in claim 1, wherein the means for accommodating the patient is a diagnostic chair, which chair is mounted for angular movement about a vertical axis, and a headrest carried by said chair.

7. An apparatus as set forth in claim 6, wherein the free end of said elongate support member is angled through 90°, the chair being mounted on the elongate support member to be displaceable along said free end.

8. An apparatus as set forth in claim 7, wherein the chair is connected to the elongate support member by releasable locking means.

9. An apparatus as set forth in claim 1, further comprising an additional housing which is releasably secured to the said housing and which contains electronic means for processing the measurements obtained by said detector.

* * * * *